United States Patent Office 3,291,697
Patented Dec. 13, 1966

3,291,697
FUEL ELEMENT FOR NUCLEAR REACTOR
Warren P. Chernock, West Hartford, Conn., assignor to Combustion Engineering, Inc., Windsor, Conn., a corporation of Delaware
No Drawing. Filed Dec. 16, 1963, Ser. No. 330,536
4 Claims. (Cl. 176—69)

This invention relates generally to the nuclear reactor art and has specific relation to and concern with fuel elements of nuclear reactors wherein the fuel is in the form of a densified mass or body of particulate material contained within a protective housing or sheaving.

In accordance with the invention there is provided such a fuel element wherein the densified mass of particulate material is comprised of a mixture of particles of different material with the size distribution being such that after irradiation, the particles of different material in a spent fuel element can be readily segregated whereby fuel recycling and reprocessing operations are substantially simplified.

The densified mass or body of particulate material of the fuel element of this invention can include a mixture of particles of different fissionable material; a mixture of particles of an un-fueled neutron moderator material and particles of a fissionable material; a mixture of particles of different fissionable material and particles of an un-fueled neutron moderator material; a mixture of particles of fertile material and particles of fissionable material; a mixture of particles of moderator material, particles of fertile material and particles of fuel material; a mixture of particles that contain both fissionable and fertile material with or without the addition of moderator particles, or a mixture of particles that contain fissionable and/or fertile material and moderator material with or without moderator material particles per se. The particles of these different materials that make up the mixture of the densified mass or body of material are within size ranges that are mutually exclusive such as these particles of different materials may be readily separated and segregated after irradiation and for the purpose of fuel recycling.

Accordingly it is an object of the present invention to provide an improved fuel element for nuclear reactors.

It is a further object of the invention to provide an improved fuel element of the type wherein a densified mass of particulate material is contained within a protective housing.

A still further object of the invention is to provide such an improved fuel element wherein the mass of material is comprised of particles of different material and wherein separation of these particles of different material after irradiation is simply accomplished.

Other and further objects of the invention will become apparent to those skilled in the art as the description proceeds.

With the aforementioned objects in view, the invention comprises an arrangement, construction and combination of the elements of the inventive organization in such a manner as to obtain the results desired as hereinafter more particularly set forth.

The fuel element of the invention can be of any desired shape, such as cylindrical, prismatic or spherical and the container or protective housing can be of any suitable material with this housing having the purpose of metal, ceramic or graphite. Zirconium, aluminum, the shape of the element, protecting the densified particulate material from corrosion and containing fission products. The housing should preferably have a relatively low neutron absorption cross-section and it may be made of metal ceramic or graphite. Zirconium, aluminum, stainless steel, nickel base alloys and niobium base alloys are among materials that are considered suitable for providing a housing for the densified particulate mass. One of the preferred configurations for this type of fuel element is cylindrical whereby tubular housings may be used with a stainless steel tube about 1 inch in diameter and having a wall thickness of about .050 inch and a length of between 5 and 10 feet being one of the desirable housings for fuel elements of the type to which the invention pertains.

Particulate material, which may include particles of both fissionable and unfissionable material (fertile and moderator material) is positioned within the housing and is densified in any desired and known manner, such as vibratory compaction. The housing is, of course, made fluid-tight and the fuel element is ready for use.

The material of which the densified body or mass is composed is made up of two or more different materials whereby fuel elements having specific desired characteristics may be provided. This body of material may include fuel particles, wherein the fissionable material is either $U^{235}$-$Pu^{239}$ or $U^{233}$ and/or fertile particles ($Th^{232}$ or $U^{238}$). It may also contain particles which are solely for moderating purposes and have no fuel or fertile material in them at all, such as particles of carbon and beryllium. More specifically, the fuel particles may consist of particles of the oxides, carbides, nitrides or sulfides of plutonium, uranium and thorium or combinations of these compounds either as mixtures or solid solutions. Thus the densified body of particulate material may be comprised of particles of an unfueled neutron moderator and particles of one or more of the aforementioned compounds or the body of material may consist of one or more of the aforementioned compounds without there being any unfueled neutron moderator particles or with moderator being combined therewith. The fuel or fertile particles, i.e., the particles of the aforementioned compounds or combinations thereof which contain a fissionable or fertile material, are preferably coated with a suitable coating that will keep fission fragments within the fuel particle. This coating, for example, may be a metal oxide, a metal carbide, graphite or other suitable materials.

In accordance with the invention, the particles of different material that make up the densified body of material are within mutually exclusive size ranges such that after irradiation these particles of different material may be separated by simple screen processes prior to reprocessing and recycling the fuel material whereby simplification of this reprocessing and recycling procedure may be effected.

The following is illustrative of the invention:

There is provided a fuel element having a stainless steel tubular housing of 1 inch with a wall thickness of .050 inch and a length of 6 feet. This tube is sealed by being capped at both ends and disposed within the tube is a densified mass of particulate material having a density of 88 percent of theoretical. This mass of densified material is made up of particles of plutonium, carbide, depleted uranium carbide and graphite. Of the total volume of this mass, about 60 percent is depleted uranium carbide, 15 percent is plutonium carbide and 25 percent graphite. The depleted uranium carbide particles have a size range between 6 to 16 mesh, the plutonium carbide particles have a size range between 60 to 100 mesh; and the graphite particles have a size range less than 200 mesh. These different particles are distributed generally uniformly throughout the entire mass of densified material in the stainless steel tube with these several different material particles having been mixed thoroughly together and then having been loaded into the tube through the upper end and compacted thereinto after which the tube was capped and sealed.

By having the particles of different materials that make up the densified mass be within mutually exclusive size ranges, these particles of different material may be readily segregated after irradiation and prior to reprocessing and recycling.

While I have described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A fuel element for nuclear reactors comprising a densified particulate mass contained in a housing, said mass having particles containing different materials at least some of which contain fissionable material, the size range of the particles containing different materials being different, said particles being of a material such that the different materials may be separated by simple screen processes after irradiation of the fuel element and the material thereof in a nuclear reactor.

2. A fuel element for nuclear reactors comprising a densified particulate mass contained in a housing, said mass having particles containing different fissionable materials with the size range of the particles containing different fissionable materials being mutually exclusive, said particles being of a material such that the different materials may be separated by simple screen processes after irradiation of the fuel element and the material thereof in a nuclear reactor.

3. A fuel element for nuclear reactors comprising a densified particulate mass contained in a housing said mass having some particles containing fissionable materials and others containing fertile material with these particles of different materials being in mutually exclusive size ranges, said particles being of a material such that the different materials may be separated by simple screen processes after irradiation of the fuel element and the material thereof in a nuclear reactor.

4. A fuel element for nuclear reactors comprising a densified particulate mass contained in a housing, said mass having some particles containing fissionable material and other particles consisting of moderator material with the size range of particles of different materials being different, said particles being of a material such that the different materials may be separated by simple screen processes after irradiation of the fuel element and the material thereof in a nuclear reactor.

References Cited by the Examiner
UNITED STATES PATENTS

| | | | |
|---|---|---|---|
| 3,039,945 | 6/1962 | Slack et al. | 176—90 |
| 3,088,892 | 5/1963 | Cain et al. | 176—69 |
| 3,096,263 | 7/1963 | Kingston et al. | 176—90 |
| 3,135,665 | 6/1964 | Koutz et al. | 176—37 X |

BENJAMIN R. PADGETT, *Primary Examiner.*

L. DEWAYNE RUTLEDGE, CARL D. QUARFORTH,
*Examiners.*

J. V. MAY, M. J. SCOLNICK, *Assistant Examiners.*